(12) United States Patent
Swann

(10) Patent No.: US 9,146,566 B2
(45) Date of Patent: Sep. 29, 2015

(54) FUEL SYSTEM

(71) Applicant: ROLLS-ROYCE PLC, London (GB)

(72) Inventor: Peter Swann, Nottingham (GB)

(73) Assignee: ROLLS-ROYCE plc, London (GB)

( * ) Notice: Subject to any disclaimer, the term of this patent is extended or adjusted under 35 U.S.C. 154(b) by 224 days.

(21) Appl. No.: 13/896,766

(22) Filed: May 17, 2013

(65) Prior Publication Data

US 2013/0340324 A1    Dec. 26, 2013

(30) Foreign Application Priority Data

Jun. 22, 2012  (GB) .................................. 1211058.1

(51) Int. Cl.
G05D 11/13    (2006.01)
F02C 3/30     (2006.01)
F02C 9/40     (2006.01)

(52) U.S. Cl.
CPC ................ G05D 11/132 (2013.01); F02C 3/30 (2013.01); F02C 9/40 (2013.01); F05D 2270/08 (2013.01); Y02T 50/671 (2013.01); Y02T 50/677 (2013.01)

(58) Field of Classification Search
CPC .......... F02C 3/30; F02C 9/40; G05D 11/132; G05D 2270/08; Y02T 50/671; Y02T 50/677; F05D 2270/08
See application file for complete search history.

(56) References Cited

U.S. PATENT DOCUMENTS

| | | |
|---|---|---|
| 3,289,409 A | 12/1966 | Schirmer |
| 3,517,505 A | 6/1970 | Anderson et al. |
| 3,517,512 A | 6/1970 | Anderson et al. |
| 4,471,744 A | 9/1984 | Holtz |
| 4,766,725 A | 8/1988 | Singh |
| 5,005,355 A | 4/1991 | Singh |
| 5,285,256 A | 2/1994 | Nelson et al. |
| 5,469,830 A | 11/1995 | Gonzalez |
| 5,546,183 A | 8/1996 | Fegley et al. |
| 5,911,210 A * | 6/1999 | Flach ........................... 123/527 |
| 2007/0175459 A1 | 8/2007 | Williams et al. |
| 2008/0072577 A1 | 3/2008 | Taylor et al. |
| 2009/0013591 A1 | 1/2009 | Bradin et al. |
| 2010/0043443 A1 | 2/2010 | Noppel et al. |
| 2010/0122519 A1 | 5/2010 | Epstein et al. |
| 2010/0132330 A1 | 6/2010 | Noppel et al. |

FOREIGN PATENT DOCUMENTS

| | | |
|---|---|---|
| GB | 2 058 211 A | 4/1981 |
| JP | A-61-149566 | 7/1986 |
| WO | WO 2008/065238 A1 | 6/2008 |

OTHER PUBLICATIONS

Sep. 18, 2012 Search Report issued in British Application No. GB1211058.1.

(Continued)

*Primary Examiner* — Cephia D Toomer
(74) *Attorney, Agent, or Firm* — Oliff PLC

(57) ABSTRACT

A fuel system (10) comprising a fluid blender (14) in fluid communication with a source of a first fuel composition and a source of a second fuel composition via at least one inlet (32, 34). The blender (14) is operable to receive at least the first fuel composition and/or second fuel composition via the at least one inlet (32, 34), and output a resultant fuel composition comprising the received fuel compositions via at least one outlet (36). The at least one outlet (36) is in fluid communication with an engine fuel injection device (38).

17 Claims, 2 Drawing Sheets

(56) References Cited

OTHER PUBLICATIONS

Sep. 27, 2012 Search Report issued in British Application No. GB1211064.9.
Oct. 18, 2012 Search Report issued in British Application No. GB1211061.5.

U.S. Appl. No. 13/896,690, filed May 17, 2013 in the name of Peter Swann.
U.S. Appl. No. 13/896,793, filed May 17, 2013 in the name of Peter Swann.

* cited by examiner

FUEL SYSTEM

The present disclosure relates to a fuel system.

Vapour trails are artificial clouds that are visible trails of condensed water vapour exhausted by vehicles' engines. They may be formed as warm, moist exhaust gas mixes with ambient air, and arise from the precipitation of microscopic water droplets or, if the air is cold enough, tiny ice crystals. The term "vapour trails" is intended to refer both to condensation trails (i.e. contrails) from aircraft and to water and/or ice precipitation in or attributable to the exhaust plumes from engines of other machines and vehicles, such as ships.

The vapour trails of ships are undesirable for some applications. For example, a military ship producing a vapour trail from its exhaust funnels is highly visible from the air and hence much easier to target.

It is known that, depending on the timescale considered, the climate-warming impact of aircraft exhaust vapour trails and resulting vapour trail cirrus is of a magnitude similar to or perhaps even greater than that of the $CO_2$ emitted by aircraft, and therefore represents a significant element of aviation's total climate impact.

It is also known that the climate warming impact of a vapour trail of a given horizontal extent is determined, at least in part, by its optical depth. Recent scientific work has established that suitable reductions in the number of soot particles emitted per unit mass of fuel burned by an aircraft's engine could reduce the initial optical depth of exhaust vapour trails. Hereafter in this application the number of soot particles emitted per unit mass of fuel burned is termed the "soot emission index".

US2010/0122519 describes the use of ultra-low sulphur aviation fuel as an alternative to conventional fuel to reduce sulphur by-product generation and hence reduce contrail formation. This document emphasises the need to retain the purity of the ultra-low sulphur aviation fuel, and hence the requirement to manage the supply chain which delivers the fuel, and to avoid mixing with other fuels.

The attempted suppression of vapour trail formation through the reduction of exhaust water vapour content through use of a heat exchanger and condenser arrangement (US2008072577A) potentially introduces significant weight into the engine. Furthermore, the weight penalty is incurred throughout the full duration of a flight, even though vapour trail suppression may only be required for a small percentage of the flight time.

Attempted suppression of vapour trail formation through the use of directed electromagnetic energy (US2010132330A) into the engine exhaust plume could incur a weight penalty. Furthermore, the energy required to operate the system could represent a significant portion of the engine power and thus incur a fuel-burn penalty. Further, in military applications, the emission of powerful electromagnetic radiation has the undesirable effect of increasing the aircraft's detectability.

Attempted suppression of vapour trail formation through the use of ultrasound directed into the engine exhaust plume (US2010043443A) may also incur a material weight penalty associated with equipment for generating the required sound levels.

The attempted modification or suppression of vapour trails through the use of chemicals (U.S. Pat. No. 5,005,355A, U.S. Pat. No. 4,766,725A, U.S. Pat. No. 3,517,505A, U.S. Pat. No. 3,517,512A, US2009013591A) injected either into the engine (whether with the fuel or separately from the fuel) or into the exhaust plume presents the prospect of additional pollution, incurs a weight penalty through the need to carry fuel additives with potentially little or no calorific value of their own (in comparison with conventional aviation fuel when burned within the engine), and may present challenges to engine reliability and/or component life.

The attempted hiding of vapour trails through introducing black carbon into the aircraft engine effluent (U.S. Pat. No. 3,289,409A) results in additional emissions of a species which is known to have a positive warming impact on climate.

The strategy of avoiding regions prone to vapour trail formation and/or persistence through the routing of aircraft around, above and/or below such regions has the disadvantage that it increases workload for air traffic control and/or pilots, reduces airspace capacity and, in the case of routing around regions prone to vapour trail formation or persistence, which can be tens or hundreds of kilometres in horizontal extent, the length of the route followed by the aircraft is increased, resulting in a fuel-burn penalty. Additionally in the case of climbing so as to fly above regions prone to vapour trail formation or persistence, additional fuel is burned to provide the increased thrust necessary to perform the climb. If aircraft are scheduled to fly below regions prone to vapour trail formation or persistence, additional fuel may be burned subsequently if the aircraft is to return to its optimal cruising altitude once the aircraft has passed the avoided region.

In the case either of climbing so as to fly above or of descending so as to fly below regions of air susceptible to vapour trail formation and/or persistence, the aircraft will be required to fly at an altitude that may differ from the optimal cruise altitude given the aircraft's current weight. In other words, the ability of the aircraft to follow an optimal cruise-climb trajectory is hindered by the requirement to change altitude so as to avoid the region of air susceptible to vapour trail formation and/or persistence.

Hence a system/process/method/device which supports an objective of reducing the optical depth of vapour trails, therefore potentially reducing their climate warming impact, whilst optimising the use of available fuels, is highly desirable.

SUMMARY

Accordingly there is provided a fuel system comprising a fluid blender in fluid communication with a source of a first fuel composition and a source of a second fuel composition via at least one inlet, the blender being configured to receive at least the first fuel composition and/or second fuel composition via the at least one inlet and output a resultant fuel composition comprising the received fuel compositions via at least one outlet the at least one outlet being in fluid communication with an engine fuel injection device.

The system provides the advantage of enabling control over vapour trail optical depth by selectively blending together, on demand, a first and second fuel for use in an engine. Hence a fuel composition tuned to operation requirements can be generated at the point in the usage of the engine when it is required.

There is also provided a method of providing fuel to an engine during a period of operation of the engine, the method comprising the steps of: operating a fluid blender in fluid communication with a source of a first fuel composition and a source of a second fuel composition via at least one inlet, the blender being configured to receive at least the first fuel composition and/or second fuel composition via the at least one inlet, and delivering a resultant fuel composition comprising the received fuel compositions via at least one outlet to an engine.

The method provides the advantage of enabling control over vapour trail optical depth by selectively blending together, on demand, a first and second fuel for use in an engine. Hence a fuel composition tuned to operation requirements can be generated at the point in the usage of the engine when it is required.

In some embodiments the fuel blender mixes the first fuel composition and second fuel composition to produce the resultant fuel composition.

In some embodiments a regulator controls the percentage of first and second fuel composition which are blended together.

In some embodiments the regulator responds to a signal from a control unit which defines the percentage of first and second fuel composition to be blended together.

In some embodiments a blending ratio calculator associated with the control unit calculates the required resultant fuel composition as a function of desired soot emission index determined by a soot requirement generator which communicates the desired value of soot emission index to the blending ratio calculator.

In some embodiments the soot requirement generator determines a value of optimal soot emission index for the resultant fuel composition.

In some embodiments the soot requirement generator calculates the desired soot emission index as a function of one or more measured values of ambient temperature, ambient pressure, ambient humidity and/or vapour trail optical depth.

In some embodiments the blending ratio calculator
 a. receives a value for instantaneous measured actual values of soot emission index generated by the engine from a sensing means;
 b. compares the actual value of soot emission index to a desired value of soot emission index;
 c. determines action required to achieve the desired soot emission index.

In some embodiments the method further comprises the use of a vapour trail modelling tool to first determine ambient air conditions in dependence upon actual measured values of ambient air conditions, and then determine the likelihood of vapour trail formation and/or vapour trail persistence based upon engine operating point and the determined ambient air conditions.

In some embodiments a comparator compares output from the vapour trail modelling tool with an instantaneous actual vapour trail observation and determines the effect of the resultant fuel composition on vapour trail optical depth.

In some embodiments the first fuel composition has an aromatic and/or other non-paraffinic content substantially higher than that of the second fuel composition.

In some embodiments the first fuel composition is Kerosene.

In some embodiments the second fuel composition is a biofuel, or "gas-to-liquids" (GTL) fuel, or other fuel characterised by low levels of aromatic and/or other non-paraffinic content.

BRIEF DESCRIPTION OF THE DRAWINGS

Examples of the present disclosure will now be described with reference to the accompanying drawings, in which.

DETAILED DESCRIPTION

Figure 1:
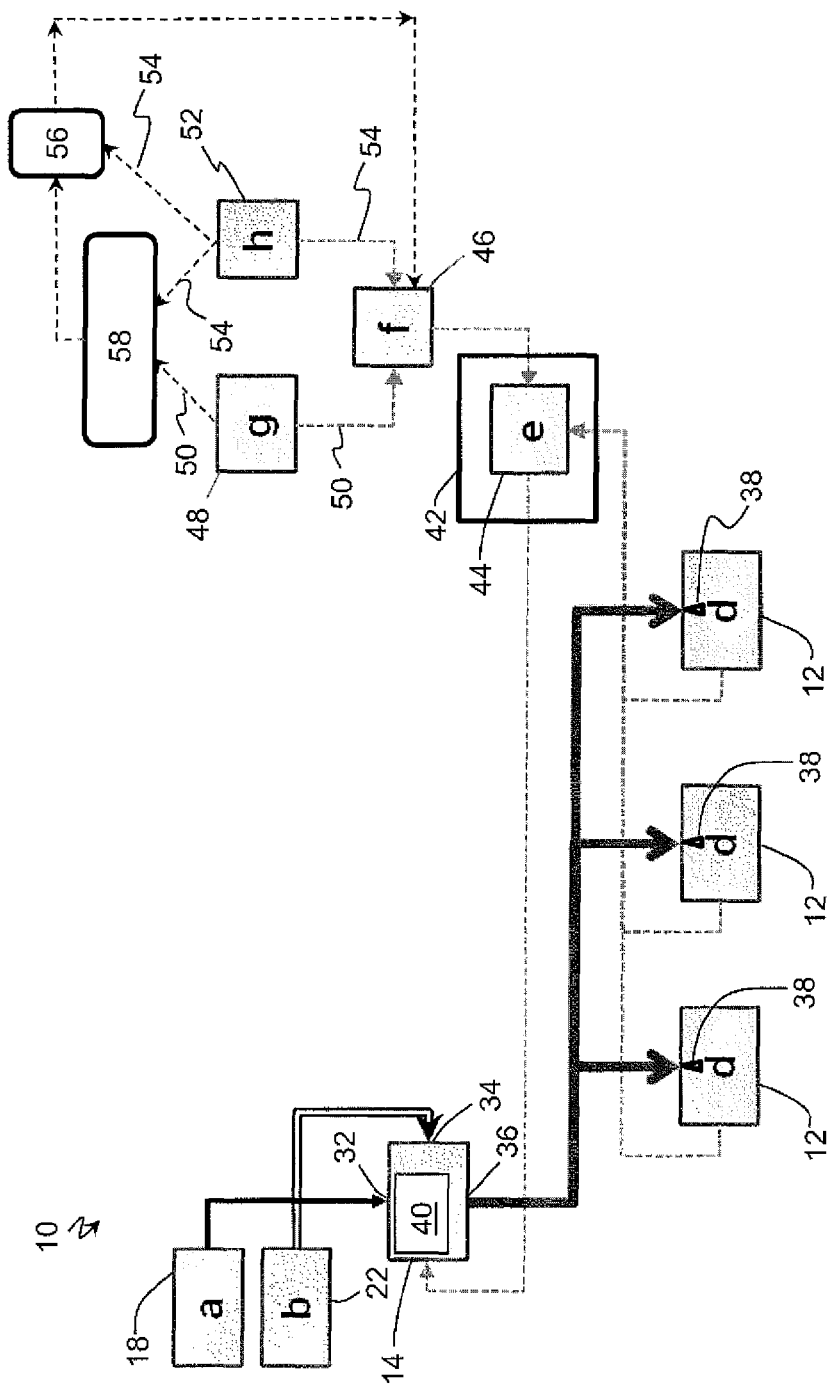
FIG. 1 shows a diagrammatic representation of an example of the fuel system of the present disclosure.

FIG. 1 shows a diagrammatic representation of a fuel system 10 according to the present disclosure integrated with multiple engines 12. The engines 12 may form part of a vehicle, for example an aircraft or marine vessel. Although the example in FIG. 1 shows three engines, the device of the present disclosure is equally applicable to single or multi-engine systems.

The system 10 comprises a fluid blender 14 in fluid communication with a source of a first fuel composition, shown as a first tank 18 for storage of the first fuel composition and a source of a second fuel composition, shown as a second tank 22 for storage of the second fuel composition. The first tank 18 and second tank 22 are fluidly isolated from one another. The blender 14 is operable to mix the first fuel composition and second fuel composition to produce a resultant fuel composition.

In the example shown the fuel blender 14 has a first inlet 32 in fluid communication with the first tank 18, and a second inlet 34 in fluid communication with the second tank 22, and is thus configured to receive at least the first fuel composition and/or second fuel composition. In an alternative example, the fuel blender 14 has a single inlet which is in fluid communication with both the first tank 18 and the second tank 22.

The term "tank" is taken to mean a single vessel, or one of a network of fluidly connected vessels, where each network is fluidly isolated from the other networks.

The blender 14 is configured to output the resultant fuel composition comprising the received fuel compositions via at least one outlet 36, the at least one outlet 36 being in fluid communication with an engine fuel injection device 38 on each engine 12. The fuel injection device 38 may be any type of fuel injector, for example a fuel nozzle, airspray injector, or plain orifice. The fuel injection device 38 may comprise one fuel injector, or a plurality of fuel injectors. Although in FIG. 1 only one fuel injector 38 is shown, each engine 12 may be fitted with a number of fuel injectors 38, each in fluid communication with the fuel blender 14.

The fuel blender 14 comprises a regulator 40 for controlling the percentage of first and second fuel composition which are blended together. In an alternative example the regulator 40 is provided separately to, and upstream from, the fuel blender 14. In such an example, inlets 32, 34 would be provided in the regulator 40, and the fuel blender 14 would have at least one inlet which would be in fluid communication with an outlet of the regulator 40.

The regulator 40 is responsive to a signal from a control unit 42 which defines the percentage of first and second fuel composition to be blended together. The control unit 42 comprises a blending ratio calculator 44 configured to calculate the required resultant fuel composition as a function of desired soot emission index determined by a soot requirement generator 46, where the soot requirement generator 46 is operable to communicate the value of desired soot emission index to the blending ratio calculator 44.

The fuel system 10 also comprises a first sensor array 48 configured to produce signals 50 indicative of ambient temperature, ambient pressure, ambient humidity and/or vapour trail optical depth. The soot requirement generator 46 is in communication with the first sensor array 48 to receive the one or more measured values. The fuel system 10 optionally comprises a second sensor array 52 configured to produce a signal 54 indicative of instantaneous actual soot emission index. The second sensor array 52 may be mounted appropriately such that each sensor in the array has a sensing region or field of view which includes any part of the engine's internal airflow after the point of combustion, and/or the engine exhaust duct, and/or or the region into which exhaust from the engine is directed, and/or the region where vapour trails form or may form. The soot requirement generator 46 is in communication with the second sensor array 52 to receive a value for instantaneous measured actual values of soot emission index generated by the engine(s) 12, which is communicated to the control unit 42 and blending ratio calculator 44.

Alternatively the blending ratio calculator 44 may be in direct communication with the second sensor array 52 to receive the signal 54 indicative of instantaneous measured actual values of soot emission index generated by the engine(s) 12.

The soot requirement generator 46 is configured to calculate the desired soot emission index as a function of one or more measured values of ambient temperature, ambient pressure, ambient humidity and/or vapour trail optical depth. The soot requirement generator 46 may comprise a model and/or algorithm for direct calculation of the desired soot emission index. Alternatively, or additionally, the desired soot emission index is derived from a look up table or database in dependence upon one or more of the first and second fuel composition, combustion characteristics of the engine 12 and engine operating point. The engine operating point is defined by a collection of parameters including ambient temperature, ambient pressure, ambient humidity and for example one or more of fuel-flow rate, temperatures and pressures of the gas flow at various parts of the engine, thrust produced by the engine, and other parameters indicative of the state of the engine.

The soot requirement generator may be configured to receive signals indicative of the engine stat of the engine(s).

Additionally or alternatively the blending ratio calculator 44 may be configured to calculate the required resultant fuel composition in dependence upon at least the instantaneous actual soot emission index. That is to say, the blending ratio calculator 44 may be configured to use a value of actual soot emission index being generated by the engine(s) 12 in determining whether or not the relative constituent parts of the resultant fuel composition (e.g. the first and second fuel compositions) should be adjusted relative to one another, in an iterative process as required, to thereby reduce the error between the desired soot emission index and the actual soot emission index.

Additionally or alternatively the blending ratio calculator 44 may be configured to calculate the required resultant fuel composition in dependence upon one or more of the composition of the first fuel composition and second fuel composition. The calculation of the resultant fuel composition by the blending ration calculator 44 may also depend on parameters indicative of the state of the engine (such as one or more of fuel-flow rate, temperatures and pressures of the gas flow at various parts of the engine, thrust produced by the engine and the speed of the engine through the ambient air). In particular the blending ratio calculator 44 may be configured to calculate the required resultant fuel composition in dependence upon the aromatic and/or other non-paraffinic content (for example as expressed as percentage by mass or alternatively percentage by volume) of the first fuel composition and of the second fuel composition. The first and second fuel compositions may be determined by direct analysis or derived from a database or data record.

The system 10 further comprises a vapour trail modelling tool 58 configured to first determine ambient air conditions in dependence upon actual measured values of ambient air conditions, and then to determine the likelihood of vapour trail formation and/or vapour trail persistence based upon one or more of the parameters defining the engine operating point and the determined ambient air conditions. The vapour trail modelling tool 58 may be further configured to communicate to the control unit 42 a signal indicative of the determined likelihood of vapour trail formation and/or persistence.

The control unit 42 may determine which of a default fuel composition and a composition which may enable the optical depth of the vapour trail to be reduced is employed. This determination may be based on the determined likelihood of contrail formation and/or persistence, and taking into account an operational policy specifying the conditions under which vapour trail optical-depth modification should be attempted.

The comparator 56 may also be configured to compare output from the vapour trail modelling tool 58 with an instantaneous actual vapour trail observation signal 54 to determine the effect of the resultant fuel composition on vapour trail optical depth.

Figure 2:
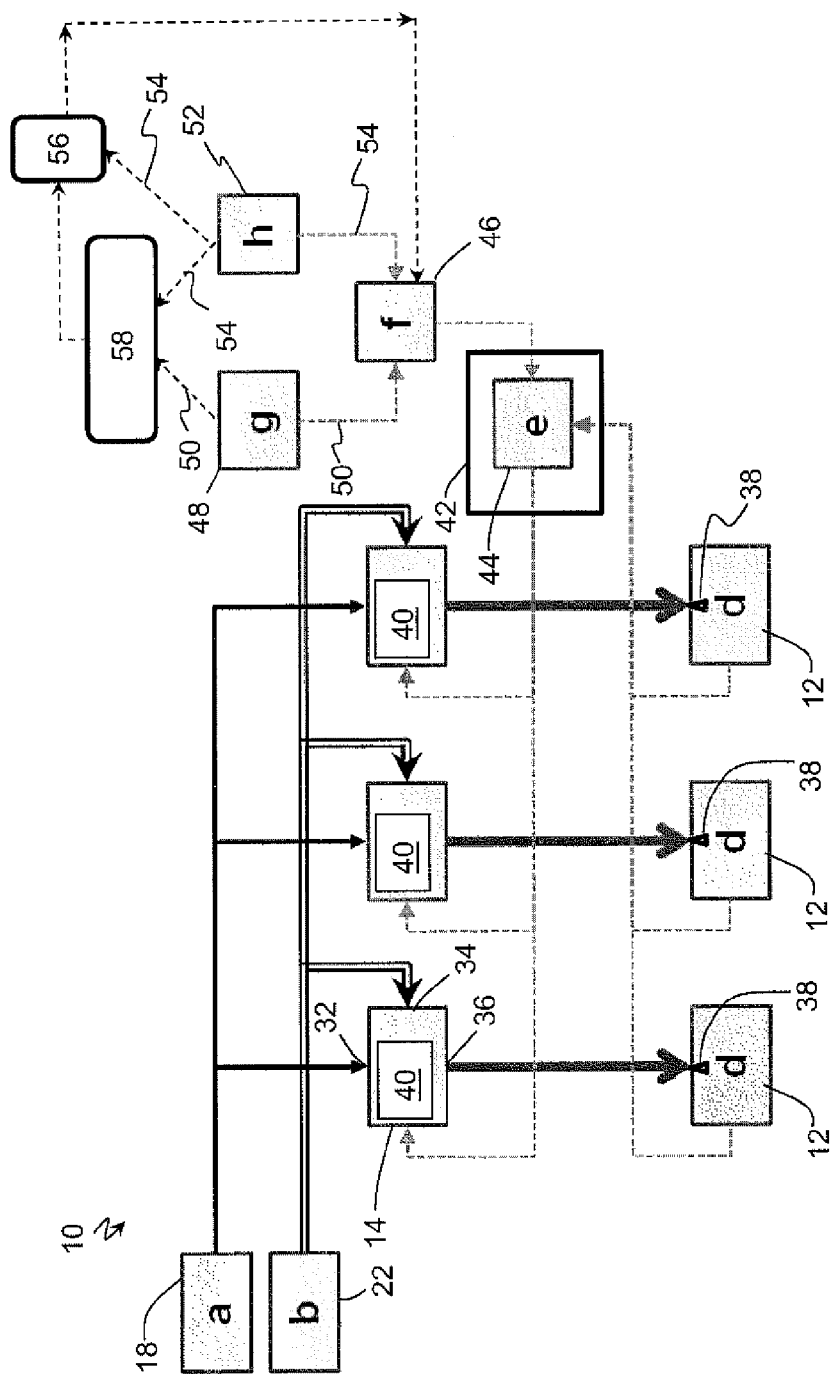
FIG. 2 is an alternative example of the fuel system of the present disclosure.

An alternative example is shown in FIG. 2. This example is essentially the same as the FIG. 1 example, except that each engine 12 is in fluid communication with a dedicated fuel blender 14, and each fuel blender 14 is in fluid communication with the first tank 18 and second tank 22.

Further variants may also be contemplated in which each fuel injector 38 has its own dedicated fuel blender 40 and/or regulator 14.

The system 10 is thus configured to provide fuel to the engine(s) 12 during a period of operation of the engine(s) 12.

The soot requirement generator 46 determines a value of optimal soot emission index which would generate optimal vapour trail optical depth for a given ambient condition. From this it determines a value of desired soot emission index which is employed to calculate or otherwise determine the resultant fuel composition which, when supplied to the engine(s) 12, is intended to achieve the desired soot emission index in the exhaust plume of the engine. The soot requirement generator 46 calculates or otherwise determines the desired soot emission index as a function of one or more measured values of ambient temperature, ambient pressure, ambient humidity and/or vapour trail optical depth. Hence the system 10 is configured to adapt to different ambient conditions, where different ambient conditions will result in vapour trails having different optical depths for the same soot emission index.

In the context of the present disclosure, "optimal" soot emission index is the soot emission index which, if realised in practice under the prevailing ambient conditions, would lead to a minimisation of optical depth of a young contrail, and hence a minimisation of the young contrail's climate warming impact. Under some ambient conditions the "optimal" soot emission index may correspond to the minimum achievable soot emission index given the available fuels and any constraints that may place limits on the blending ratios that may be employed. Alternatively, under other ambient conditions, the "optimal" soot emission index may be higher or lower than the minimum achievable soot emission index. The "desired" soot emission index may be identical to the optimal soot emission index. However, in cases where the optimal soot emission index cannot be achieved, due perhaps to limitations on the range of allowable or achievable fuel blending ratios, then the "desired" soot emission index would represent an alternative target which lies within the range that can be achieved by the system.

The blending ratio calculator 44 associated with the control unit 42 calculates the required resultant fuel composition as a function of desired soot emission index determined by the soot requirement generator 46 which communicates the value of desired soot emission index to the blending ratio calculator 44.

The regulator 40 responds to a signal from the control unit 42 which defines the percentage of first and second fuel composition to be blended together. The regulator 40 controls the defined percentages of first fuel composition and second fuel composition which are taken from the first and second tanks 18, 22 respectively, and delivered to the blender 14. The blender 14 is configured to mix the first fuel composition and second fuel composition to produce the resultant fuel composition. The resultant fuel composition is then delivered to the engine(s) 12. The resultant fuel composition may comprise any proportion of first fuel composition and second fuel composition in the range from 0% to 100%. The resultant fuel composition may comprise x % of the first fuel composition and (100−x) % of the second fuel composition, where x has a value anywhere in the range from 0 to 100. For example, the resultant fuel composition may comprise 0% of the first fuel composition and 100% of the second fuel composition. Alternatively the resultant fuel composition may comprise 100% of the first fuel composition and 0% of the second fuel composition. Additionally x may have a value of greater than 0 and less than 100.

In an alternative example the resultant fuel composition may comprise a % of the first fuel composition, b % of the second fuel composition and c % of additional fuel or additive compositions, where a+b+c=100%, and a, b or c may have a value anywhere in the range from 0 to 100.

The vapour trail modelling tool 58 operates to first determine ambient air conditions in dependence upon actual measured values of ambient air conditions, and then to determine the likelihood of vapour trail formation and/or vapour trail persistence based upon one or more of the parameters defining the engine operating point and the determined ambient air conditions. The vapour trail modelling tool 58 may be further configured to communicate to the control unit 42 a signal indicative of the determined likelihood of vapour trail formation and/or persistence.

The comparator 56 compares output from the vapour trail modelling tool 58 with an instantaneous actual vapour trail observation and determines the effect of the resultant fuel composition on vapour trail optical depth. The result of the comparison is fed back to the soot requirement generator 46, and thus the blending ratio calculator 44, and further adjustments to the resultant fuel composition made as required to achieve the desired soot emission index and hence desired vapour trail optical depth.

Alternatively or additionally the soot requirement generator receives a value for instantaneous measured actual values of soot emission index 54 generated by the engine from the sensing means 52, compares the actual value of soot emission index to a desired value of soot emission index, and determines action required to achieve or approach the desired soot emission index.

Alternatively the blending ratio calculator 44 may be in direct communication with the second sensor array 52 to receive the signal 54 indicative of instantaneous measured actual values of soot emission index generated by the engine(s) 12.

The system may further comprise a means of determining by measurement and/or calculation whether or not vapour trail formation (irrespective of subsequent persistence) is likely under current ambient conditions and engine operating point. For example the Schmidt-Appleman criterion may be applied and coupled with an assumption of a linear or approximately linear mixing trajectory in the space defined by temperature and $H_2O$ partial pressure.

The first fuel composition may have an aromatic and/or other non-paraffinic content substantially higher than that of the second fuel composition. In one example the first fuel composition is Kerosene. Additionally or alternatively the second fuel composition is a biofuel. The second fuel composition may be a low-soot-producing (LSP) or alternatively a low-sulphur, low-soot-producing (LSLSP) fuel. Alternatively or additionally the second fuel may be a blend of several such LSP and/or LSLSP fuels whose physical and chemical properties make it suitable for use in an engine in combination with the first fuel composition, for example as an aviation fuel when blended with conventional kerosene. Examples include (but are not limited to) coal-to-liquids (CTL), gas-to-liquids (GTL), biomass-to-liquids (BTL), synthetic paraffinic kerosene (SPK), hydrotreated renewable jet-fuel (HRJ), alcohol-to-jet, and Hydro-processed Esters and Fatty Acids (HEFA).

The system 10 is operable to blend fuel, or to simply deliver one of the stored fuel compositions. That is to say it may optionally be employed or not employed according to policy decision. For example in the absence of vapour trail formation, one may choose to use only one of the first or second fuel compositions, and hence the resultant fuel composition will simply be the first or second fuel composition. For example 100% kerosene may be delivered to the engines 12, rather than a blend of kerosene and biofuel. Alternatively where the ambient conditions are such that vapour trails form but do not persist (i.e. in ambient air not super-saturated with respect to ice), the system could be operated or not operated, depending on the extent to which the occurrence of temporary vapour trails is considered desirable or not. Additionally if the engine is operating near, but not in, a region of ice-supersaturation and it was predicted that prevailing winds may direct exhaust soot into the region of ice-supersaturation, the system may be operated to produce a soot emission index that will reduce the incidence of cloud formation or enhancement in the said nearby region. However, in situations where vapour trails form and persist, it is envisaged that the system would operate so as to reduce the optical depth of the "young" vapour trail.

The system herein described is thus advantageous since it enables control over vapour trail optical depth by selectively blending together on demand (for example) a conventional fuel together with a fuel characterised by low levels of aromatic and/or other non-paraffinic content for use in an engine to optimise soot emission index in the products of combustion from the engine. Thus one of the fuels (for example a fuel characterised by low levels of aromatic and/or other non-paraffinic content) need only be used during part of the operation of the engine. This is of particular benefit as such fuels tend to be more expensive to produce. Thus the system of the present invention enables reduction of the optical depth, and hence the climate warming impact, of vapour trails in a cost effective mariner.

The device/method of the present disclosure has little weight penalty, little power requirements in usage, and maximises the climate benefits of a given volume of, for example, biofuel.

In examples where the system of the present disclosure is used as part of an aircraft, i.e. to deliver fuel to aircraft engines, the aircraft need not avoid unfavourable altitudes at which vapour trails would be unavoidable for an aircraft burning conventional fuel (e.g. kerosene), and hence will tend to travel less distance, and tend to travel at favourable altitudes, thereby minimising its overall fuel consumption. Furthermore such a system avoids any loss of airspace capacity because it reduces the climate warming impact associated with aviation induced cloudiness formed whilst cruising within ice-supersaturated regions. In other words the device/method of the present disclosure enables the aircraft to follow an optimal cruise-climb trajectory, whilst minimising the resulting vapour-trail related climate impact.

Thus the device/method of the present disclosure maximises climate benefit for a given expenditure on alternative fuels.

In examples where the system of the present disclosure is applied to marine vessels, it could enable the reduction of vapour trails generated from the vessel's exhaust, sometimes referred to as "ship tracks".

Although the examples of the system and method herein described relate to the blending of a first and second fuel composition, further examples include the blending of additional fuel compositions with the first and second fuel compositions to produce the resultant fuel composition. In such examples further storage tanks may be required for each additional fuel composition, which are fluidly isolated from the first and second tanks described above.

Hence the system of the present disclosure will enable vehicles (aircraft, marine etc) to control vapour trail optical depth, thus increasing their envelope of operation.

The invention claimed is:

1. A fuel system comprising
a fluid blender in fluid communication with a source of a first fuel composition and a source of a second fuel composition via at least one inlet,
the blender being operable to receive at least the first fuel composition and/or second fuel composition via the at least one inlet, and output a resultant fuel composition comprising the received fuel compositions via at least one outlet, and
the at least one outlet being in fluid communication with an engine fuel injection device;
a regulator for controlling a percentage of the first and second fuel composition which are blended together; and
a control unit,
the regulator being responsive to a signal from the control unit which defines the percentage of the first and second fuel composition to be blended together, and
the control unit comprises a blending ratio calculator configured to calculate a required resultant fuel composition as a function of desired soot emission index, the desired soot emission index determined by a soot requirement generator which is operable to communicate a desired value of soot emission index to the blending ratio calculator.

2. A fuel system as claimed in claim 1 wherein the fuel blender is configured to mix the first fuel composition and second fuel composition.

3. A fuel system as claimed in claim 1 wherein the source of the first fuel composition is a first tank for storage of the first fuel composition; the source of the second fuel composition is a second tank for storage of the second fuel composition; the first tank and second tank being fluidly isolated from one another.

4. A fuel system as claimed in claim 1 wherein the blending ratio calculator is configured to adjust the resultant fuel composition to iterate towards the desired soot emission index.

5. A fuel system as claimed in claim 1 further comprising a sensor configured to produce a signal indicative of instantaneous actual soot emission index, wherein the blending ratio calculator is configured to calculate the required resultant fuel composition in dependence upon the difference between the desired soot emission index and the instantaneous actual soot emission index.

6. A fuel system as claimed in claim 1 wherein the soot requirement generator determines a value of desired soot emission index which would generate optimal vapor trail optical depth for given ambient conditions and engine operating point.

7. A fuel system as claimed in claim 1 wherein the soot requirement generator comprises a model and/or algorithm for direct calculation of the desired soot emission index.

8. A fuel system as claimed in claim 1 wherein the soot emission index is derived from a look up table or database in dependence upon one or more of the first and second fuel composition, combustion characteristics of the engine and engine operating point defined by a collection of parameters comprising ambient temperature, ambient pressure, ambient humidity and parameters indicative of the state of the engine.

9. A fuel system as claimed in claim 1 wherein the soot requirement generator is configured to calculate the desired soot emission index as a function of one or more measured values of ambient temperature, ambient pressure, ambient humidity and/or vapor trail optical depth.

10. A fuel system as claimed in claim 9 wherein the soot requirement generator is in communication with at least one sensor to receive the one or more measured values.

11. A fuel system as claimed in claim 1 comprising a vapor trail modeling tool configured to first determine ambient air conditions in dependence upon actual measured values of ambient air conditions, and then to determine the likelihood of vapor trail formation and/or vapor trail persistence based upon engine operating point and ambient air conditions.

12. A fuel system as claimed in claim 11 further comprising a comparator for comparing output from the vapor trail modeling tool with an instantaneous actual vapor trail observation to determine the effect of the resultant fuel composition on vapor trail optical depth.

13. An engine comprising a fuel system as claimed in claim 1.

14. A vehicle comprising a fuel system as claimed in claim 1.

15. An aircraft comprising a fuel system as claimed in claim 1.

16. A marine vessel comprising a fuel system as claimed in claim 1.

17. A method of providing fuel to an engine during a period of operation of the engine, the method comprising the steps of:
operating a fluid blender in fluid communication with a source of a first fuel composition and a source of a second fuel composition via at least one inlet, the blender being configured to receive at least the first fuel composition and/or second fuel composition via the at least one inlet,
controlling a percentage of the first and second fuel composition which are blended together via a regulator, and
delivering a resultant fuel composition comprising the received fuel compositions via at least one outlet to an engine,
the regulator being responsive to a signal from a control unit which defines the percentage of the first and second fuel composition to be blended together, and
the control unit comprises a blending ratio calculator configured to calculate a required resultant fuel composition as a function of desired soot emission index, the desired soot emission index determined by a soot requirement generator which is operable to communicate a desired value of soot emission index to the blending ratio calculator.

* * * * *